United States Patent [19]

Richards

[11] Patent Number: 4,853,954
[45] Date of Patent: Aug. 1, 1989

[54] DIAL-UP LINE MODEM DIRECTLY COMPATIBLE WITH MAINFRAME HOST HAVING BISYNCHRONOUS COMMUNICATION PROTOCOL

[75] Inventor: John C. Richards, Huntsville, Ala.

[73] Assignee: Universal Data Systems, Inc., Huntsville, Ala.

[21] Appl. No.: 8,713

[22] Filed: Jan. 28, 1987

[51] Int. Cl.[4] .......................................... H04M 15/32
[52] U.S. Cl. ...................................................... 379/93
[58] Field of Search ................. 375/8, 10, 36; 379/93, 379/96, 98; 371/15, 22, 32, 33, 49; 370/13, 15, 103, 82

[56] References Cited

U.S. PATENT DOCUMENTS

| | | | |
|---|---|---|---|
| 3,979,719 | 9/1976 | Tooley et al. | 371/32 |
| 4,385,384 | 5/1983 | Rosbury et al. | 371/15 |
| 4,393,501 | 7/1983 | Kellogg et al. | 371/33 |
| 4,429,382 | 1/1984 | Greenstein et al. | 370/82 |
| 4,549,297 | 10/1985 | Nishimoto | 371/33 |
| 4,665,521 | 5/1987 | Smith | 371/15 |
| 4,700,358 | 10/1987 | Duncanson et al. | 379/93 |
| 4,715,044 | 12/1987 | Gartner | 379/93 |

OTHER PUBLICATIONS

The publication *All about Modems and Related Topics* by John A. Jurenko, Publication No. 7, Oct. 1981, pp. 245-249.
The manual for the "LineMaster" manufactured by Microframe, Inc., pp. 1-12.

*Primary Examiner*—Gerald L. Brigance
*Assistant Examiner*—Richard Hjerpe
*Attorney, Agent, or Firm*—Charles L. Warren

[57] ABSTRACT

The modem of this invention is capable of direct connection to a communication Host associated with a mainframe computer which uses a bisynchronous (bisync) protocol so that the Host believes a valid terminal is continuously connected regardless of whether the modem is online or offline. This permits communications to be established with the mainframe over the public switched telephone network.

17 Claims, 4 Drawing Sheets

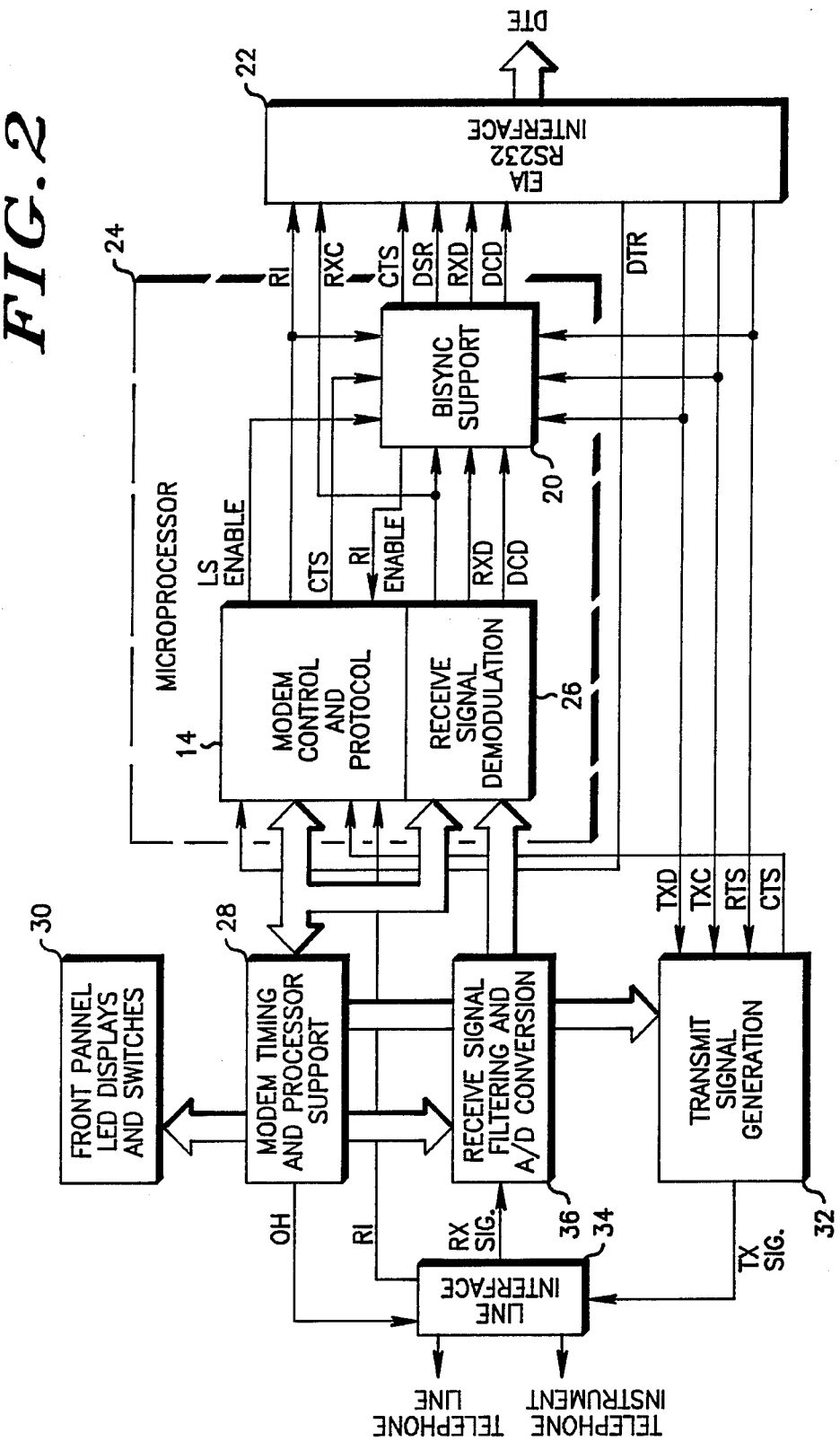

DIAL-UP LINE MODEM DIRECTLY COMPATIBLE WITH MAINFRAME HOST HAVING BISYNCHRONOUS COMMUNICATION PROTOCOL

BACKGROUND OF THE INVENTION

This invention is directed to dial-up modems which communicate over the public switched telephone network and more specifically to such a modem which permits direct connection with a dedicated Host line which uses bisynchronous 3270 communication protocol without requiring system operator assistance.

Older computer systems used a bisynchronous (bisync) communications protocol which assumed the use of dedicated lines and compatible bisync terminals. With the current availability of relatively low cost modems, it is desirable to be able to communicate over the public switched telephone network with such computers. Control units (CU), such as an IBM 3704/3705 or NCR Comten, are used to handle communications for these computer systems. As used herein, Host refers to such CU's and not the mainframe computer itself.

Because the Host periodically interrogates or polls the terminal expected to be active on a dedicated communication line and expects certain acknowledgements, a conventional modem connected to such a line must always be connected with a bisync terminal or terminal emulator in order to satisfy the required protocol. Thus requires the use of a dedicated line between the modem at the Host and the modem at the terminal, and constant communication with the terminal so that it can respond to the polls.

To establish communication between the modem at the Host and a modem at a terminal emulator over a dial-up telephone line, a system operator at the Host site had to be alerted by the remote user and cause the Host to reactivate communications on the dedicated line connected with the modem. The reactivation was needed since the Host would have previously found the expected terminal to be unavailable due to no response to polls and would have inactivated communications. The need for system operator assistance in order to establish communications over a dial-up telephone line represents a substantial impediment.

One approach to this problem is to use a special purpose microprocessor controlled device as an interface between the Host and the modem, such as a LineMaster made by Microframe, Inc. Its purpose is to satisfy the Host if a remote terminal is not active and to be transparent when a remote terminal is active. Although this approach does allow dial-up telephone line communications, it represents: a substantial cost as compared to the cost of the modem, an increased possiblilty of a communication link failure, and an inability to take advantage of controls available internally in the modem.

SUMMARY OF THE INVENTION

It is an object of this invention to provide a modem which can be directly connected to a bisync Host and support bisync protocol in the absence of communications with a bisync terminal.

A modem according to the present invention must respond like a bisync terminal when offline, i.e. not in communication with another modem (on-hook). When the modem is online, the modem does not reply to Host polls except for a general poll if the remote terminal does not send a response within a predetermined time. The remote terminal or terminal emulator is expected to provide bisync support when the Host modem is online. Failure of the remote terminal to provide a valid response to a general poll for a predetermined number of polls will cause the modem to return to the offline state.

BRIEF DESCRIPTION OF THE DRAWINGS

FIG. 2 is a functional block diagram illustrating a modem according to the present invention.

DETAILED DESCRIPTION

Figure 1:
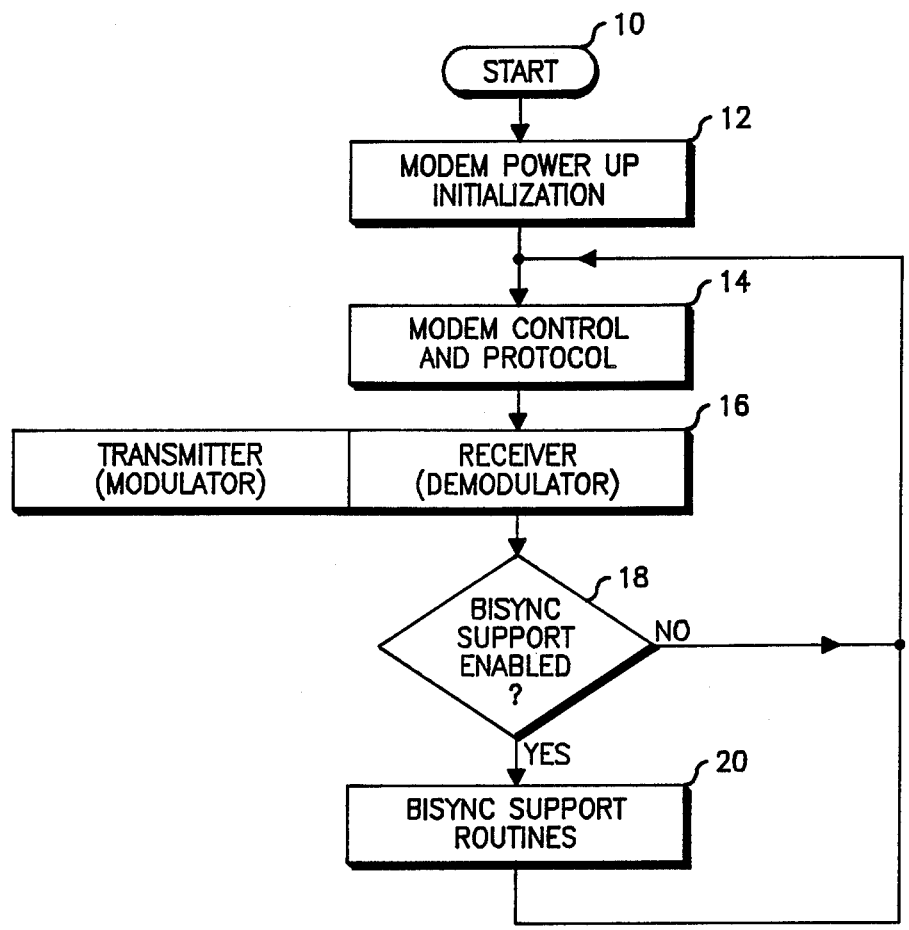
FIG. 1 is a flow chart showing general modem operation and the special bisync line support.

The flow diagram in FIG. 1 illustrates the general operation of a modem including bisync support according to the present invention. After the start 10, modem power-up and initialization 12 occurs. Control then passes to modem control and protocol function 14 which controls the transmitter (modulator) and receiver (demodulator) function 16. Following the data sent or received by function 16, control passes to the bisync support function 20 if the bisync support is enabled s determined by decision branch 18. If bisync support function 20 is not enabled, control reverts back to standard modem control and protocol function 14. After the bisync function is complete, the modem control and protocol function 14 is given control. FIG. 1 shows the bisync support function 20 incorporated into the modem operation.

The functional block diagram of a modem according to this invention shown in FIG. 2 illustrates the bisync support function 20 in relationship to the other elements. Since the operation of the other elements will be known to those skilled in the art, only a brief description of the other elements follows. Commonly known and used abbreviations are used to label certain paths and signals. An RS232 interface 22 facilitates communications between the Data Terminal Equipment (DTE) or Host and the modem. A microprocessor system 24 supports the bisync function 20, modem control and protocol function 14, and the received signal demodulator 26. The modem timing and processor support function 28 controls the front panel LED's and decodes the switch information represented by block 30. The transmit signal generation function 32 receives the transmit data (TXD) and generates the TX signal which is coupled to the telephone line interface 34. The RX signal from element 34 is filtered and A/D converted by function 36. Function 28 also provides clock and timing information to filler function 36 and transmit function 32.

In order to be compatible with bisync protocol, the proper reply to Host message must be sent. Thus, it is necessary to understand the different types of polls and the corresponding valid replies. The following table shows Host bisync messages and modem replies. The modem must be ready to send a valid reply in the offline state as indicated in the table.

| Host Message | Modem Offline Response |
|---|---|
| Eot | None |

-continued

| Host Message | | | | | Modem Offline Response | | | | | | | |
|---|---|---|---|---|---|---|---|---|---|---|---|---|
| 37 | | | | | | | | | | | | |
| RVI (reverse interupt) | | | | | | | | | | | | |
| Dle | @ | | | | Eot | | | | | | | |
| 10 | 7C | | | | 37 | | | | | | | |
| ACK0 | | | | | | | | | | | | |
| Dle | — | | | | Eot | | | | | | | |
| 10 | 70 | | | | 37 | | | | | | | |
| ACK1 | | | | | | | | | | | | |
| Dle | / | | | | Eot | | | | | | | |
| 10 | 61 | | | | 37 | | | | | | | |
| 3270 Cu Selection | | | | | | | | | | | | |
| — | — | Sp | Sp | Enq | Dle | @ | | | | | | |
| 60 | 60 | 40 | 40 | 2D | 10 | 7C | | | | | | |
| 3270 General Poll | | | | | | | | | | | | |
| Sp | Sp | Sp | Sp | Enq | Eot | | | | | | | |
| 40 | 40 | 7F | 7F | 2D | 37 | | | | | | | |
| 3270 Specific Poll | | | | | 3270 Status | | | | | | | |
| Sp | Sp | A | A | Enq | Soh | % | R | Stx | Sp | A | Sp | & | Etx | BCC |
| 40 | 40 | C1 | C1 | 2D | 01 | 6C | D9 | 02 | 40 | C1 | 40 | 50 | 03 | xx xx |

In the above table values in hexadecimal are given below the mnemonic or printable character. The underlined values may vary depending on CU and device addresses sent by the Host. In the modem response, only bytes 5,6,10, and 11 in the reply to 3270 Specific Poll varies. Bytes 5 and 6 correspond to bytes 1 and 3 in the poll; bytes 10 and 3 in the poll; bytes 10 and 11 (xx) consist of a two byte CRC-16 calculation sent low byte first. Preceding sync characters and trailing pad characters are not shown in the table. It is assumed that the Host will raise RTS (request to send) before sending a message.

Figure 3A:
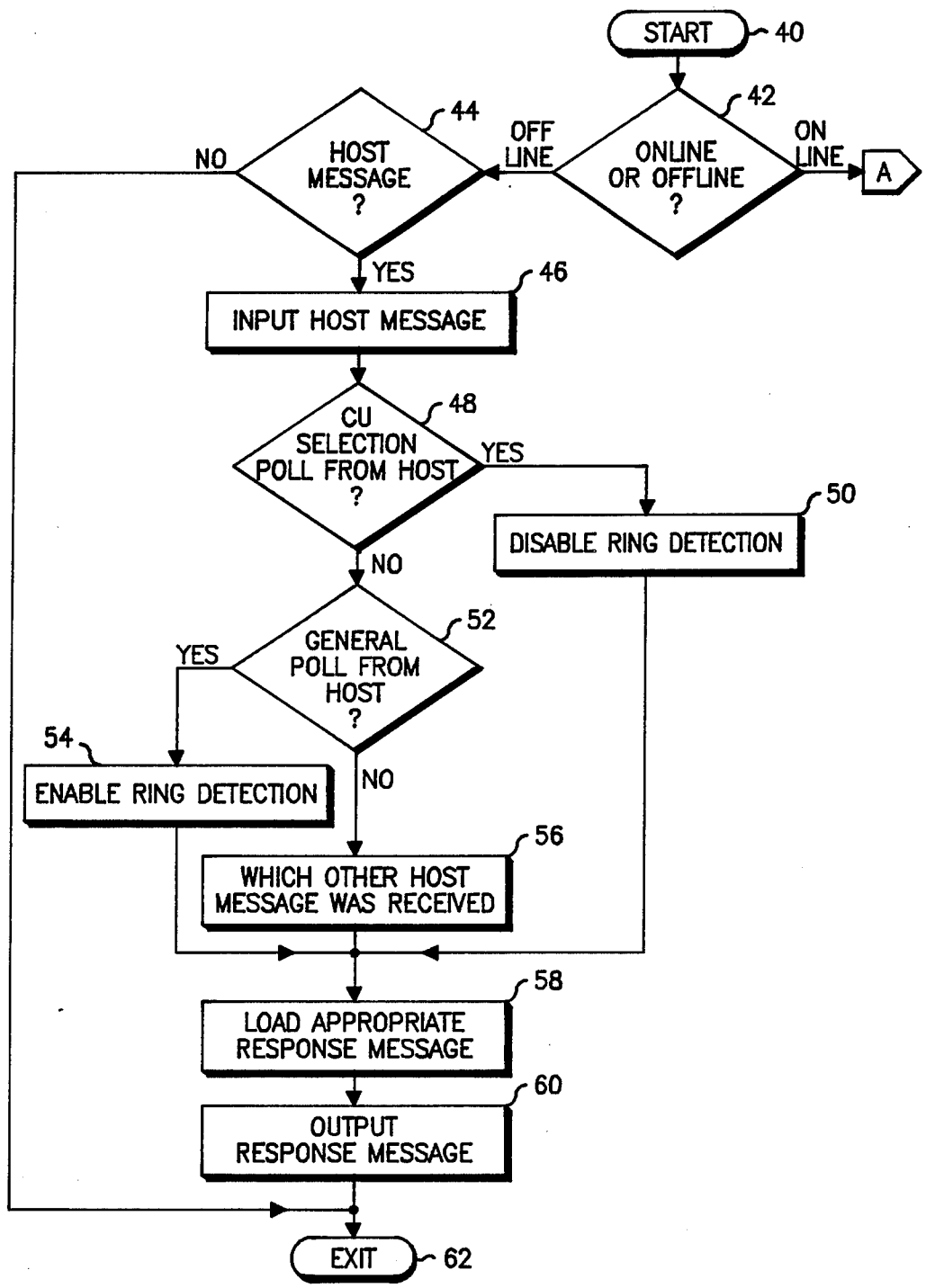
FIGS. 3A and 3B comprise a flow chart illustrating the bisync line support operation.
Figure 3B:
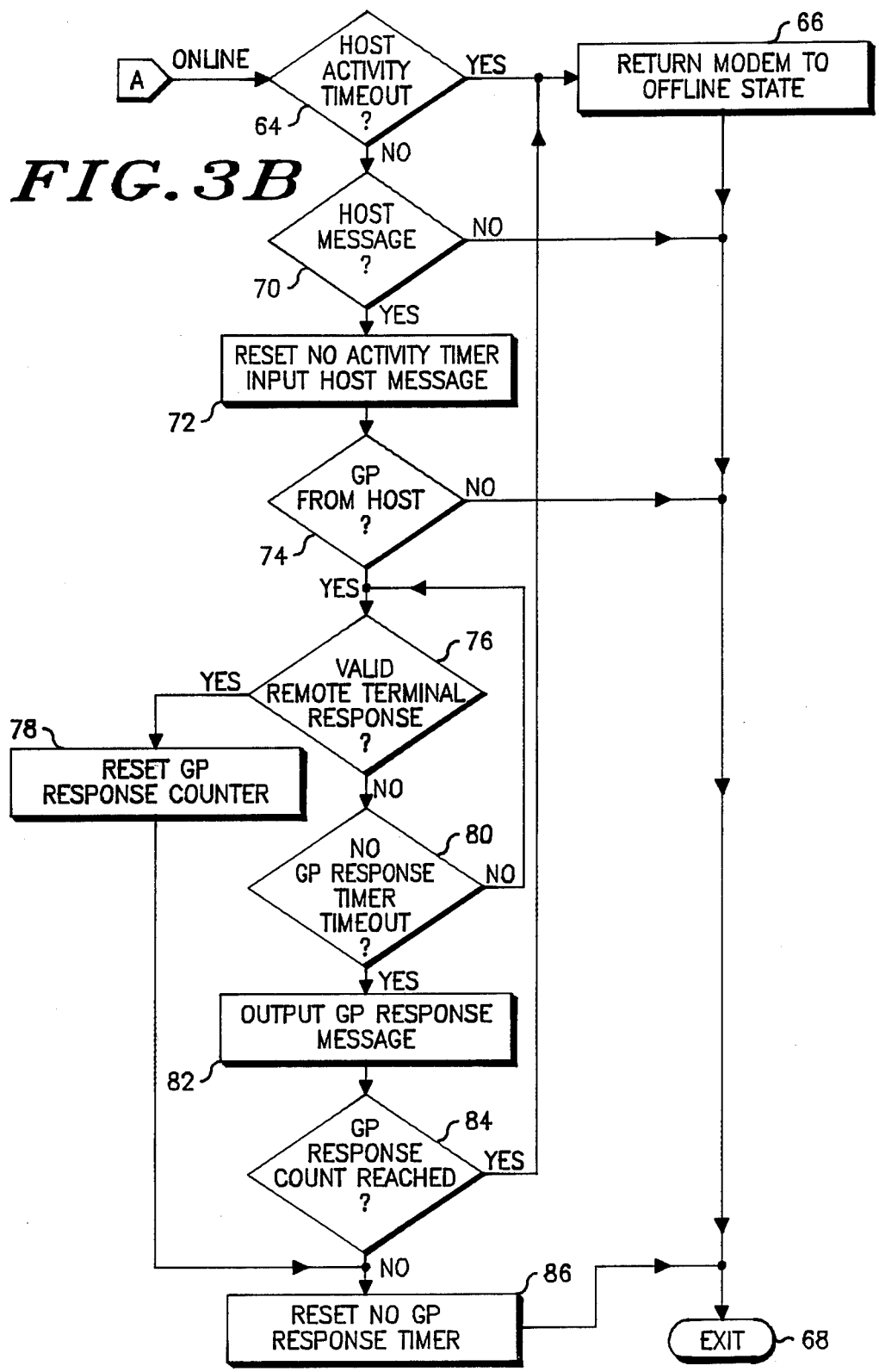

FIGS. 3A and 3B are a detailed flow chart illustrating the bisync support function 20. This bisync support routine is suitable for use as part of a main program used by a modem to control is functions. Upon the entry or start 40, a decision block 42 determine if the modem is online or offline. It offline, another decision block 44 determines if a Host poll has been received. If yes, the input message function 46 receives and stores the poll; if no, control exits the bisync support 20 by exit 62 since no reply to the Host is required.

In decision block 48 a determination is made if the message from the Host is a CU selection poll. In bisync protocol a CU selection message is sent before a 3270 specific poll. If the Host message is a CU selection poll, the modem ring detector is disabled by ring disable function 50 to prevent establishing communication with a calling modem before all necessaary Host communications are concluded. It is evident from the table that a specific poll, which would follow a CU selection poll, requires a substantial reply including the calculation of a two byte BCC (block check character). If the message is not a CU selection poll, decision block 52 determines if the message is a general poll(GP). If the message is a GP, then function 54 enables the ring detector thereby permitting communications to be established with a calling modem. A GP is a normal, often encountered, poll which does not require a complicated reply. If the message is not a GP, then function 56 determines the type of Host message received. Upon reaching function 58 the appropriate reply in accordance with those shown in the table has been determined and loaded. The loaded reply is sent by function 60 and control exits this routine at exit 62 to the main modem program.

Referring to FIG. 3B, a determination that the modem is online by block 42 diverts control to the other main path in the bisync support routine. The Host activity timeout decision block 64 determines if there has been no Host messages for a predetermined time interval, such as 20 seconds. If the decision is yes, which indicates a Host problem or malfunction, function 66 returns the modem to the offline state thereby causing the telephone line connection to be dropped. This is a failsafe precaution to prevent the modem to modem communication link from being maintained but with no data being sent. Control passes to the modem program via exit 68.

If the Host activity timer had not timed out, then block 70 determines if a Host message has been received. If a Host message has not been received, then control passes via exit 68. Unless a Host bisync message has been received there is no need to send a reply. If a Host message is received then function 72 resets the Host activity timer and stores the Host message. If the message is determined by block 74 not to be a GP, then an exit occurs. The remote terminal or terminal emulator in communication via modem is responsible for replying to the Host bisync messages when the modem is online.

The remainder of the online branch of the bisync support routine deals with the transition from online to offline without violating the bisync protocol. If the Host message is a GP as determined by block 74, then a determination is made by block 76 if a valid remote terminal response has been received. If yes, then function 78 resets a counter that counts the number of replies to a GP that the bisync routine had to make because the remote terminal did not send a valid reply. As will be explained in reference to the other elements in FIG. 3B, a failure to send a valid reply to a GP by the remote terminal for four GP's results in the modem going offline. This failure is used to sense that the terminal has hung-up or otherwise discontinued communications.

If a valid reply to a GP has not been received from the terminal as determined by block 76, a decision is made by block 80 if the terminal has sent a valid GP reply within a predetermined time interval, such as 1-2 seconds. If no, control passes back to the input of block 76 after a short delay to determine if a valid reply has now been received. This loop will continue until either a valid reply is received or the timer times out. Upon a time out, function 82 causes a valid GP reply to be sent by the bisync routing of the modem. Block 84 counts if four GP replies have been sent by the bisync routine. If yes, function 66 returns the modem to offline. If four GP replies have not been sent by the bisync routine, then function 86 resets the GP response timer and control passes to the modem program via exit 68. Waiting for four consecutive GP reply omissions by the terminal ensures that the terminal is no longer online or has malfunctioned. In either case, the Host modem goes offline and assumes responsibility for all required bisync replies. Thus, the online to offline transition is made without violating bisync protocol. This keeps the dedicated line between the Host (CU) and modem active.

The purpose of the modem according to the present invention is to make bisync Host believe that it is connected to a dedicated 4-wire bisync terminal at all times. Thus is assumes complete responsibility for bisync message replies when offline. When online, it only monitors replies to GP's by the terminal and supplies replies not sent by the terminal in order to not let the line drop when the terminal disconnects. Since the Host believes that the line is always active, no system operator assistance is needed in order to establish communication via dial-up line modem with the mainframe computer.

Although an embodiment of the present invention has been shown in the drawings and described above, the scope of the invention is defined in the claims appended hereto.

What is claimed is:

1. A modem for direct connection with a Host which utilizes bisynchronous (bisync) communications protocol comprising:
   means for converting digital data from the Host into transmission signals and means for converting received signals received by the modem into digital data that is transferred to the Host;
   first means for determining if digital data from the Host consists of a bisync message to which the Host expects a valid reply according to bisync protocol; and
   means for sending a valid reply to the Host in response to said bisync message when the modem is not in communication with a remote modem in order to maintain communication between the modem and Host by satisfying the bisync protocol.

2. The modem according to claim 1 further comprising second means for determining if, within a predetermined time interval, the signals received by the modem contain a valid reply to a previously sent Host general poll (GP) message, and sending a valid reply to the Host in response to the GP message if the signals received by the modem do not contain a valid reply within the predetermined time interval, thereby preventing the Host from discontinuing communications with the modem due to a violation of bisync protocol.

3. The modem according to claim 2 further comprising means for counting the number of consecutive times a reply was sent by the modem in response to not receiving a valid reply to a GP within the predetermined time interval, and means for terminating communications with the remote modem after said counting means counts to a predetermined number, thereby providing for a termination of communications with the remote modem while maintaining bisync protocol.

4. The modem according to claim 1 further comprising means for ceasing communications with the remote modem after a predetermined time in which no bisync messages have been received from the Host since this condition evidence a malfunction of the Host.

5. The modem according to claim 1 further comprising means for preventing the initiation of communications with the remote modem upon the receipt of a contol unit (CU) selection poll from the Host until the receipt of a general poll (GP) message from the Host.

6. The modem according to claim wherein said modem is a dial-up line modem which communicates over the public switched telephone network.

7. A method for maintaining bisynchronous (bisync) communications between a Host and a modem connected to the Host comprising the steps of:
   converting digital data from the Host into transmission signals and converting received signals received by the modem into digital data that is transferred to the Host;
   determining if digital data from the Host consists of a bisync message to which the Host expects a valid reply according to bisync protocol; and
   sending a valid reply to the Host in response to said bisync message when the modem is not in communication with a remote modem in order to maintain communication between the modem and Host by satisfying the bisync protocol.

8. The method according to claim 7 further comprising the steps of determining if within a predetermined time interval the signals received by the modem contains a valid reply to a previously sent Host general poll (GP) message, and sending a valid reply to the Host in response to the GP message if the signals received by the modem do not contain a valid reply within the predetermined time interval, thereby preventing the Host from discontinuing communications with the modem due to a violation of bisync protocol.

9. The method according to claim 8 further comprising the steps of counting the number of consecutive times a reply was sent by the modem in response to not receiving a valid reply to a GP within the predetermined time interval, and terminating communications with the remote modem when the count reaches a predetermined number, thereby providing for a termination of communications with the remote modem while maintaining bisync protocol.

10. The method according to claim 7 further comprising the steps of ceasing communications with the remote modem after a predetermined time in which no bisync messages have been received from the Host since this condition evidences a malfunction of the Host.

11. The method according to claim 7 further comprising the step of preventing the initiation of communications with the remote modem upon the receipt of a control unit (CU) selection poll from the Host until the receipt of a general poll (GP) message from the Host.

12. The method according to claim 7 wherein said modem is a dial-up line modem which communicates over the public switched telephone network.

13. In a dial-up line modem suited for connection to a Host which utilizes bisynchronous (bisync) communications, the method comprising the steps of:
   convertiong digital data from the Host into transmission signals and converting received signals received by the modem into digital data that is transferred to the Host;
   determining if digital data from the Host consists of a bisync message to which the Host expects a valid reply according to bisync protocol; and sending a valid reply to the Host in response to said bisync message when the modem is not in communication with a remote modem in order to maintain communication between the modem and Host by satisfying the bisync protocol.

14. The method according to claim 13 further comprising the steps of determining if within a predetermined time interval the siganls received by the modem contains a valid reply to a previously sent Host general poll (G)) message, and sending a valid reply to the Host in response to the GP message if the signals received by the modem do not contain a valid reply within the predetermined time interval, thereby preventing the Host from discontinuing communications with the modem due to a violation of bisync protocol.

15. The method according to claim 14 further comprising the steps of counting the number of consecutive times a reply was sent by the modem in response to not receiving a valid reply to a GP within the predetermined time interval, and terminating communications with the remote modem when the count reaches a predetermined number, thereby providing for a termination of communications with the remote modem while maintaining bisync protocol.

16. The method according to claim 13 further comprising the steps of ceasing communications with the remote modem after a predetermined time in which no bisync messages have been received from the Host since this condition evidence a malfunction of the Host.

17. The method according to claim 13 further comprising the step of preventing the initiaion of communications with the remote modem upon the receipt of a control unit (CU) selection poll from the Host unitl the receipt of a general poll (GP) message from the Host.

* * * * *

UNITED STATES PATENT AND TRADEMARK OFFICE
CERTIFICATE OF CORRECTION

PATENT NO.  :  4,853,954
DATED       :  August 1, 1989
INVENTOR(S) :  John C. Richards It is certified that error appears in the above-identified patent and that said Letters Patent is hereby corrected as shown below:

Col. 6, line 2, "evidence" should be --evidences--.

Col. 6, line 62, "convertiong" should be --converting--.

Col. 7, line 8, "siganls" should be --signals--.

Col. 7, line 10, "(G))" should be --(GP)--.

Col. 8, line 11, "evidence" should be --evidences--.

Col. 8, line 14, "initiaion" should be --initiation--.

Col. 8, line 16, "unitl" should be --until--.

Signed and Sealed this

Fourth Day of December, 1990

*Attest:*

HARRY F. MANBECK, JR.

*Attesting Officer*    *Commissioner of Patents and Trademarks*